United States Patent
Seleznev et al.

(10) Patent No.: US 8,532,298 B2
(45) Date of Patent: *Sep. 10, 2013

(54) ENCRYPTION KEY DISTRIBUTION METHOD IN MOBILE BROADCASTING SYSTEM, AND SYSTEM FOR THE SAME

(75) Inventors: Sergey Nikolayevich Seleznev, Gyeonggi-do (KR); Byung-Rae Lee, Seoul (KR); Sung-Oh Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 155 days.

This patent is subject to a terminal disclaimer.

(21) Appl. No.: 12/997,850

(22) PCT Filed: Jun. 10, 2009

(86) PCT No.: PCT/KR2009/003118
§ 371 (c)(1),
(2), (4) Date: Dec. 13, 2010

(87) PCT Pub. No.: WO2009/151277
PCT Pub. Date: Dec. 17, 2009

(65) Prior Publication Data
US 2011/0096929 A1 Apr. 28, 2011

(30) Foreign Application Priority Data

Jun. 11, 2008 (KR) ........................ 10-2008-0054826

(51) Int. Cl.
*H04W 12/04* (2009.01)
(52) U.S. Cl.
USPC ............ 380/273; 380/264; 380/270; 713/167

(58) Field of Classification Search
USPC ......................................................... 380/273
See application file for complete search history.

(56) References Cited

U.S. PATENT DOCUMENTS

| 6,510,515 | B1 * | 1/2003 | Raith ............................ 713/163 |
|---|---|---|---|
| 7,907,733 | B2 | 3/2011 | Cho et al. |

(Continued)

FOREIGN PATENT DOCUMENTS

| CN | 1947373 | 4/2007 |
|---|---|---|
| JP | 7-072793 | 3/1995 |

(Continued)

OTHER PUBLICATIONS http://read.pudn.com/downloads134/doc/comm/570893/omabcast/OMA-TS-DRM_XBS-V1_0-20080226-C.pdf, Feb. 2008.*

(Continued)

*Primary Examiner* — Kambiz Zand
*Assistant Examiner* — Yonas Bayou
(74) *Attorney, Agent, or Firm* — The Farrell Law Firm, P.C.

(57) ABSTRACT

An encryption key distribution method for service and content protection in a mobile broadcasting system, and a system for the same which includes generating, by a network, a first encryption key when the broadcast service is first provided; transmitting a generalized rights object message, which includes identification information for identifying the generated first encryption key, to the terminal; generating a second encryption key before the lifetime of the first encryption key expires; and transmitting the generalized rights object message, which includes identification information for identifying the generated second encryption key, to the terminal.

20 Claims, 8 Drawing Sheets

(56) References Cited

U.S. PATENT DOCUMENTS

| | | | |
|---|---|---|---|
| 8,077,679 B2* | 12/2011 | Leung | 370/335 |
| 8,098,818 B2* | 1/2012 | Grilli et al. | 380/44 |
| 2002/0141591 A1* | 10/2002 | Hawkes et al. | 380/278 |
| 2003/0046539 A1 | 3/2003 | Negawa | 713/163 |
| 2005/0047598 A1* | 3/2005 | Kruegel | 380/264 |
| 2005/0047600 A1* | 3/2005 | Newkirk | 380/278 |
| 2005/0172127 A1* | 8/2005 | Hartung et al. | 713/167 |
| 2007/0079381 A1* | 4/2007 | Hartung et al. | 726/26 |
| 2007/0201695 A1* | 8/2007 | Saarikivi | 380/231 |
| 2008/0080713 A1* | 4/2008 | Cho et al. | 380/273 |
| 2010/0195833 A1* | 8/2010 | Priestley et al. | 380/273 |

FOREIGN PATENT DOCUMENTS

| | | |
|---|---|---|
| JP | 2001-320357 | 11/2001 |
| JP | 2007-174491 | 7/2007 |
| JP | 2007-527178 | 9/2007 |
| KR | 100194790 | 6/1999 |
| KR | 100704678 | 4/2007 |
| KR | 1020070089027 | 8/2007 |
| KR | 100801286 | 2/2008 |

OTHER PUBLICATIONS

PCT/ISA/237 Written Opinion issued in PCT/KR2009/003118 (10pp).

* cited by examiner ent Protection architecture in Digital Rights Management (hereinafter "DRM profile"), in an Open Mobile Alliance Broadcast (OMA BCAST) service system, and a system for the same.

ENCRYPTION KEY DISTRIBUTION METHOD IN MOBILE BROADCASTING SYSTEM, AND SYSTEM FOR THE SAME

PRIORITY

This application claims priority under 35 U.S.C. §119(a) to a Korean patent application filed on Jun. 11, 2008, and assigned Application No. 10-2008-0054826, and the benefit under 35 U.S.C. §365(c) of International Application No. PCT/KR2009/003118 filed on Jun. 10, 2009, the contents of which are incorporated herein by reference.

BACKGROUND

1. Field of the Invention

The present invention relates generally to a mobile broadcasting system, and more particularly to a traffic encryption key distribution method for a mobile broadcast service, which is applied to an OMA BCAST Service Protection and Content Protection architecture in Digital Rights Management (hereinafter "DRM profile"), in an Open Mobile Alliance Broadcast (OMA BCAST) service system, and a system for the same.

2. Description of the Related Art

In the mobile communication market there is constant demand for producing a new service through the re-combination or integration of existing technology. Today developing communication and broadcast technology in conventional broadcasting systems or mobile communication systems is at the stage of providing a broadcast service through a mobile terminal (hereinafter "terminal"), such as a mobile phone, a Personal Digital Assistant (PDA), and the like. The merger of mobile communication services and Internet Protocol (IP) is at the forefront of development of next generation mobile communication technology, combined potential and actual market demand as described above, rapidly increasing user requirements for a multimedia service, service provider strategy intending to provide a new service, such as a broadcast service, in addition to an existing voice service, and interests of Information Technology (IT) companies that can meet the market demand and strengthen their mobile communication businesses.

Meanwhile, the Open Mobile Alliance (OMA), a standardization group for applications of terminals, has been conducting research on standards for interlocking between individual mobile solutions. The main role of OMA is determining various application standards for games for mobile communication, Internet services, and the like. Particularly, an OMA Browser and Content Mobile Broadcast Sub Working Group (OMA BCAST), one of the working groups of OMA, is conducting research on technology for providing a broadcast service by using a terminal. Hereinafter, a broadcasting system (hereinafter "mobile broadcasting system") discussed by the OMA BCAST working group will be briefly described.

FIG. 1 is a block diagram illustrating the network architecture of a general mobile broadcasting system.

In FIG. 1, a Content Creator (CC) 10 is a BCAST service content provider, wherein the BCAST service may include the conventional audio/video broadcast service, file download service (e.g. music file or data file download service), and the like. A BCAST Service Application unit (BSA) 20 has a function of receiving data from the Content Creator 10, handling the received data in the form appropriate for a BCAST network shown in FIG. 1, and generating BCAST service data. In addition, the BCAST Service Application unit 20 has a function of generating standardized metadata necessary for a portable broadcast guide. BCAST-1 to BCAST-8 are interfaces among entities.

In FIG. 1, a BCAST Service Distribution/Adaptation unit (BSD/A) 30 has a function of setting up a bearer to be used for transmitting the BCAST service data provided from the BSA 20, a function of determining a transmission schedule for the BCAST service, and a function of generating a portable broadcast guide. A BCAST Subscription Management unit (BSM) 40 manages subscriber subscription information for reception of BCAST service, information on provision of the BCAST service, and device information on a terminal for receiving the BCAST service.

A terminal 50, which is capable of receiving BCAST service, has a function of being able to access a cellular network according to the capability thereof. A Broadcast network 60 is a network for transmitting BCAST service, such as a Digital Video Broadcasting—Handheld (DVB-H), a Third Generation Partnership Project Multimedia Broadcast and Multicast Service (3GPP MBMS), Third Generation Partnership Project 2 Broadcast and Multicast Service (3GPP2 BCMCS), and the like. An Interaction Network 70 transmits BCAST service on a one-to-one basis, or interactively exchanges control information and additional information related to the reception of the BCAST service, and may be, for example, an existing cellular network.

Generally, in BCAST service, when a broadcast service managing server transmits encrypted service data, a plurality of terminals receive the encrypted service data. In this case, each of the plurality of terminals decrypts (i.e. deciphers) the encrypted service data, which has been provided from the server, through use of a pre-acquired encryption key (e.g. cryptographic key), thereby being able to use a corresponding service.

In connection with this, methods for encrypting broadcast content and service are roughly classified into two categories, i.e. service protection and content protection. Service protection relates to protection of a transmission channel between the BSD/A 30 and the terminal 50, and content protection relates to end-to-end protection between the BSA 20 and terminal 50.

Meanwhile, an OMA BCAST SPCP DRM profile implements a key management scheme for mobile broadcast services. Two types of keys, i.e. Long-Term Keys (LTKs) and Short-Term Keys (STKs), are defined for access and provisioning of service and content. The LTKs are used for setting up (i.e. conditioning) access criteria for STKs according to a service subscription policy for users, by encrypting the STKs through use of the LTKs. The STKs are used to actually encrypt traffic. The LTKs and STKs must be periodically updated, wherein the lifetime of the LTKs are much longer than that of the STKs. The LTKs and STKs are provided to the user by a Rights Issuer (RI).

Hereinafter, description on key management in a DRM profile will be given in detail.

FIG. 2 is a diagram illustrating a key hierarchy defined in a general DRM profile.

Referring to FIG. 2, an Inferred Encryption Key (IEK) 120 related to Registration Keys 100 and a Public/private key pair 110 are used to encrypt long-term keys which are called a Service Encryption Key (SEK) 130 and a Program Encryption Key (PEK) 140. SEKs and PEKs are transmitted to each terminal through Generalized Rights Objects (GROs). Also, the Generalized Rights Objects include permissions linked to content and other attributes. The SEKs and PEKs function to protect each subscription and program, which can be purchased in one unit. The service corresponds to one program channel, a part of a channel, or a group of program channels.

The SEK 130 is provided to a subscribed user having subscribed for the whole service, that is, a user who continuously receives content and regularly updated SEKs even without a separate request as authentication is successfully achieved. Such a scenario is called "subscription-based access."

The PEK 140 is provided to a user who is restricted to accessing a service only within a predetermined time interval, or a user who is restricted to using a program by the unit service. In order to obtain access to the next program or a consequent time interval, a corresponding user must make an additional purchase request. That is, one program and a certain time interval may be associated with one or more PEKs. Such a scenario may be called "Pay-Per-View (PPV)-based access."

The SEK is an intermediate key, and does not directly encrypt content, but encrypts a Traffic Encryption Key (TEK) 150 or PEK when necessary. The PEK is used to encrypt TEKs.

A terminal may receive a Service Authentication Seed (SAS) and a Program Authentication Seed (PAS), respectively, which are used to authenticate messages delivering TEKs, together with an SEK and a PEK. The SEK and the SAS are inclusively designated as a "Service Encryption and Authentication Key material (SEAK)." The PEK and the PAS are inclusively designated as a "Program Encryption and Authentication Key material (PEAK)."

The TEK 150 is an STK. The TEK 150 is included in a Short Term Key Message (STKM) and is then transferred, and is encrypted by an SEK or PEK when necessary. The TEK must be frequently updated for security. Such a frequent update requires the consumption of a large amount of bandwidth, which is a serious disadvantage of the key management system. That is, in order to ensure successful delivery of a TEK and simultaneously, to avoid interruption of service, STKM messages must be more frequently transmitted.

FIGS. 3 and 4 are diagrams showing examples of the aforementioned key distribution. First, FIG. 3 is a diagram illustrating a key distribution flow of an SEK and a TEK, which are provided in a general subscription-based access environment.

Referring to FIG. 3, in the subscription-based access environment, an SEK lifetime (SEK LT) is calculated to be "n" multiplied by a TEK lifetime (TEK LT). Before the current service encryption key "$SEK_{y-1}$" expires, an RI has to generate and transmit a new service encryption key "$SEK_y$" to a service subscriber in a GRO in step 210. The $SEK_y$ is encrypted by one of registration keys. Then, after the current service encryption key "$SEK_{y-1}$" has expired, PEKs delivered together with $TEK_{x+1}$, $TEK_{x+2}$ . . . , $TEK_{x+n}$ through an STKM are encrypted by the $SEK_y$. Also, before the $SEK_y$ expires, the RI generates and transmits a new service encryption key "$SEK_{y+1}$" to the service subscriber in step 220.

FIG. 4 is a diagram illustrating a supply flow of an SEK and a TEK in a general PPV-based access environment.

Referring to FIG. 4, in the PPV-based access environment, a PEK lifetime (PEK LT) is calculated to be "m" multiplied by a TEK lifetime (TEK LT). Here, $m \leq n$.

For example, when it is assumed that PEK LT=0.5*SEK LT, the PEK must be updated two times more frequently than the SEK. For example, it is assumed that the user makes two purchase requests for two consequent time intervals associated with $PEK_z$ and $PEK_{z+1}$. In this case, before a $TEK_{x+1}$ (which is a first TEK related to the $PEK_z$) is used, an RI transmits a new GRO including the $PEK_z$ to the user in step 310. The $PEK_z$ is encrypted by an $SMK_1$ shared only between the corresponding user and the RI. Before a $TEK_{x+m+1}$ (which is a first TEK related to the $PEK_{z+1}$) is used, the RI transmits a new GRO including the $PEK_{z+1}$ to the user in step 320.

However, when the user does not issue a further purchase request until a $TEK_{x+n+1}$ has been used, the RI does not transmit a PEK for the $TEK_{x+n+1}$ to the user, so that the user cannot decrypt TEKs beginning from the $TEK_{x+n+1}$. Accordingly, there is a problem in that the user cannot use a service or service content requested by the user.

SUMMARY OF THE INVENTION

The present invention has been made to address at least the above-mentioned problems and/or disadvantages, and to provide at least the advantages described below. Accordingly, an aspect of the present invention provides a method for distributing traffic encryption keys in a mobile broadcasting system, and a system for the same.

The prevent invention provides a method for newly generating a message including traffic encryption keys, and distributing and receiving the traffic encryption keys through the message in a mobile broadcasting system, and a system for the same.

In accordance with an aspect of the present invention, there is provided an encryption key distribution method for protecting a broadcast service provided to a terminal in a mobile broadcasting system, which includes generating, by a network, a first encryption key when the broadcast service is first provided to the terminal, and transmitting a generalized rights object message, which includes identification information for identifying the generated first encryption key, to the terminal; and generating, by the network, a second encryption key before a lifetime of the first encryption key expires, and transmitting the generalized rights object message, which includes identification information for identifying the generated second encryption key, to the terminal.

In accordance with another aspect of the present invention, there is provided a method for receiving, by a terminal, an encryption key distributed for protection of a broadcast service in a mobile broadcasting system, which includes verifying a generalized rights object message by means of a subscriber management key when receiving the generalized rights object message from a network; checking identification information for identifying an encryption key included in the generalized rights object message, by means of a security function; and identifying an access value pair for the encryption key through the identification information, and storing the identified access value pair.

In accordance with still another aspect of the present invention, there is provided an encryption key distribution system for protecting a broadcast service provided to a terminal in a mobile broadcasting system, the encryption key distribution system including a network for generating a first encryption key when the broadcast service is first provided to the terminal, transmitting a generalized rights object message which includes identification information for identifying the generated first encryption key, generating a second encryption key before a lifetime of the first encryption key expires, and transmitting the generalized rights object message, which includes identification information for identifying the generated second encryption key, to the terminal; and the terminal for receiving the generalized rights object message from the network, checking identification information for identifying the first and second encryption keys included in the generalized rights object message, and identifying and storing an access value pair for an encryption key through the checked identification information.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF EMBODIMENTS OF THE PRESENT INVENTION

Figure 1:
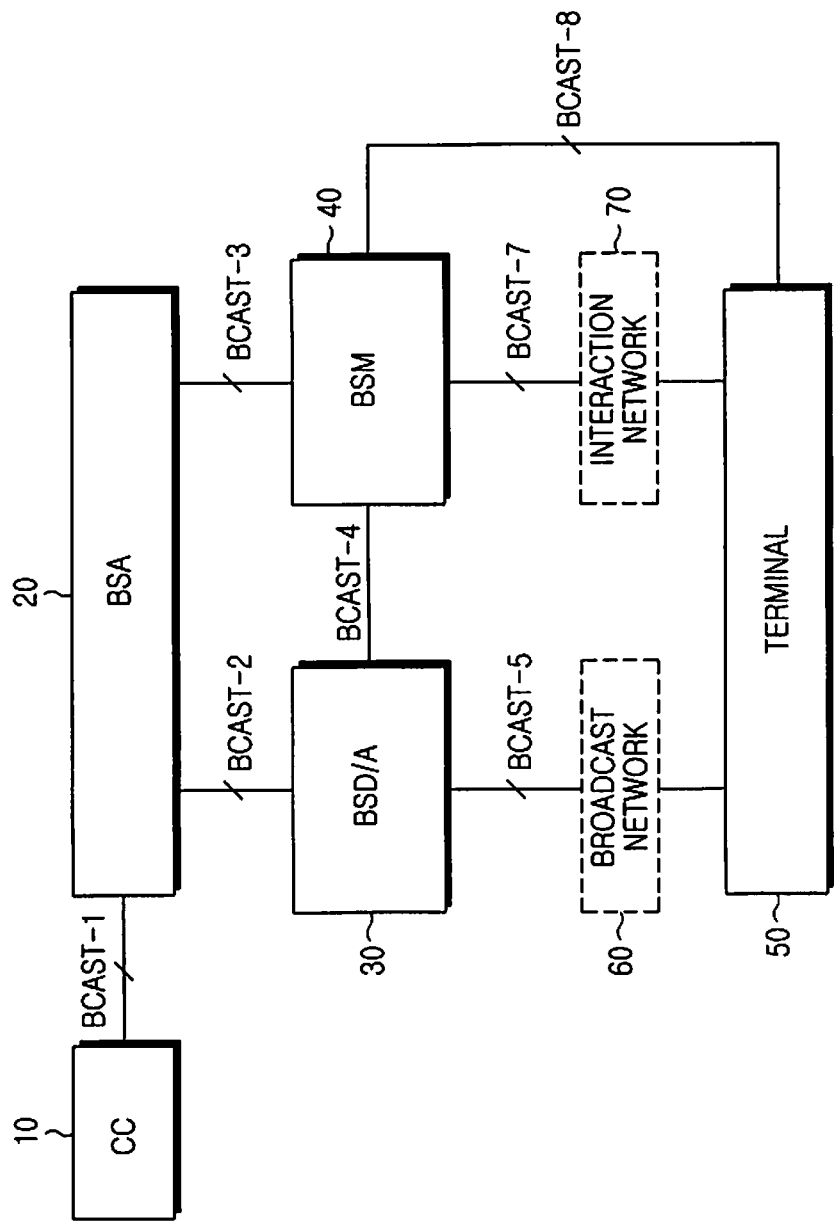
FIG. 1 is a block diagram illustrating a network architecture of a mobile broadcasting system, to which the present invention is applied.
Figure 2:
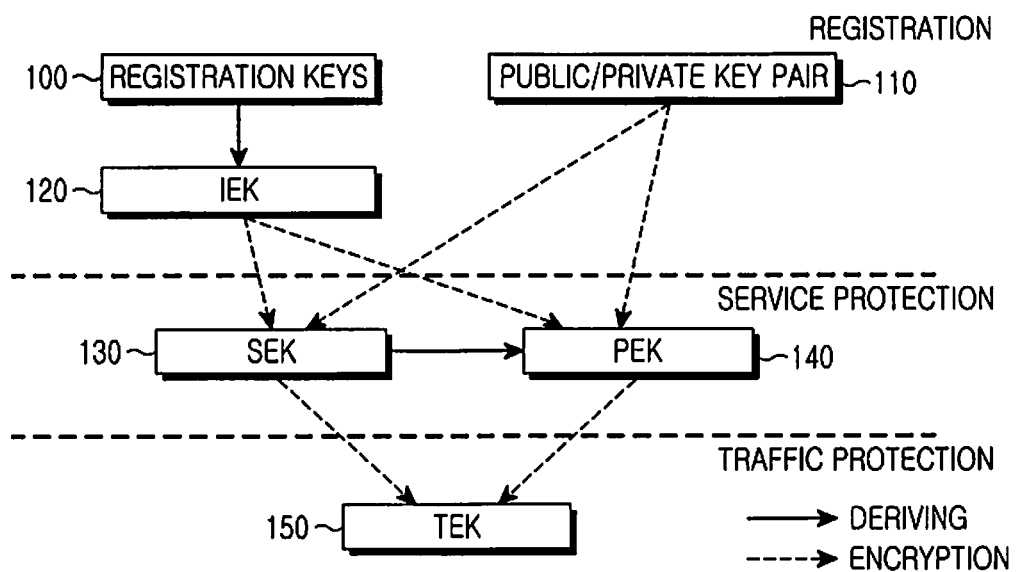
FIG. 2 is a diagram illustrating the key hierarchy of a general DRM profile.

Embodiments of the present invention are described in detail with reference to the accompanying drawings. It should be noted that the same elements are designated by the same reference numerals although they are shown in different drawings. Also, in the below description, many particular items are shown, but these are given only for providing the general understanding of the present invention. It will be understood by those skilled in the art that various changes in form and detail may be made within the scope of the present invention. Further, in the following description of the present invention, a detailed description of known functions and configurations incorporated herein will be omitted when it may make the subject matter of the present invention rather unclear.

The present invention provides a method of using Access Value Pairs (AVP) for management of traffic encryption keys (TEKs) for broadcast service, which is applied to an OMA BCAST Service Protection and Content Protection Architecture (i.e. DRM profile).

The present invention includes generation, distribution, and maintenance of an encryption key between an authorized user or user group (i.e. terminal group) and a server. The encryption key is used to protect (i.e. encrypt) a service content, which is distributed to a content/service user by a content/service provider. In connection with this, according to the present invention, service, i.e. existing access scenarios are maintained without any change, and a service encryption key (SEK) and a program encryption key (PEK) are replaced by AVP. Especially, the AVP is calculated using a random value pair, which is called a key seed pair (KSP), randomly generated by a Rights Issuer (RI). Next, the AVP is used to derive a plurality of traffic encryption keys (TEKs).

Accordingly, the present invention updates a key hierarchy, changes a TEK identification method, and prevents frequent transmission of short-term key messages (STKMs), which has occurred in the existing method. Also, a Generalized Rights Object (GRO) message newly proposed according to the present invention includes a TEK identifier (ID), access criteria, information, which has been carried through an STKM in the existing method, and an AVP. Also, the present invention provides a method of processing a GRO message in a terminal.

Figure 5:
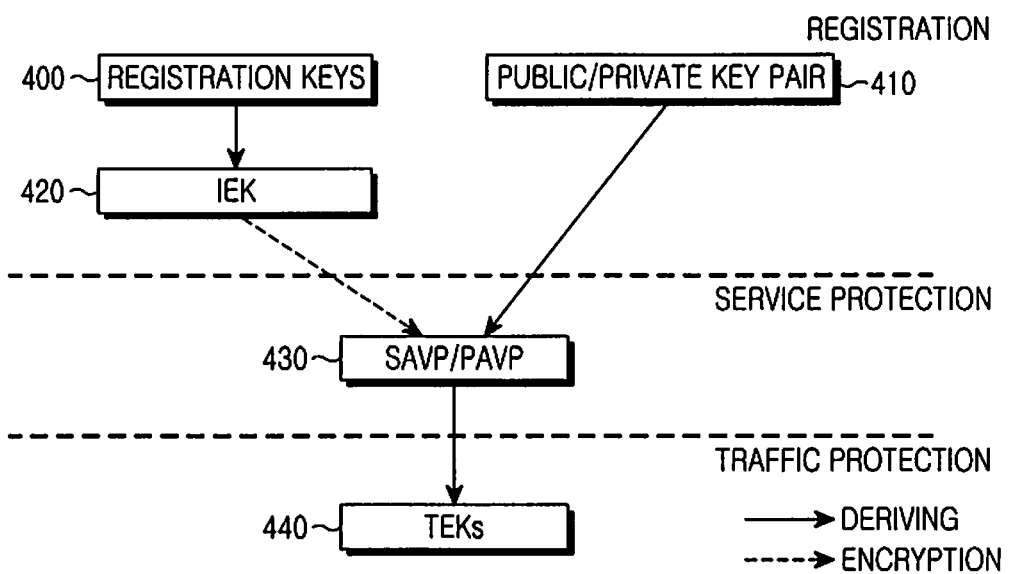
FIG. 5 is a diagram illustrating a key hierarchy of a DRM profile according to an embodiment of the present invention.

FIG. 5 is a diagram illustrating a key hierarchy according to an embodiment of the present invention.

Referring to FIG. 5, an Inferred Encryption Key (IEK) 420 related to Registration Keys (i.e. registration-level keys) 400 or a Device Public Key 410 is used to encrypt Access Value Pairs (AVP) 430. AVP (hereinafter "SAVP") for service represents Key Seed Pair KSP) values, and AVP (hereinafter "PAVP") 430 for a program represents a subset of hash values for a given service key seed pair. The AVP is transmitted to each terminal through a GRO message, and functions to protect a single subscription service or program every usage scenario (e.g. subscription-based, PPV, and the like.). The AVP is used to derive one set of Traffic Encryption Keys (TEKs) 440.

According to the present invention, TEKs are not transferred through existing Short-Term Key Messages (STKMs) any more, but are transferred through a GRO message. Accordingly, while an SAS and a PAS require an additional key material, the present invention does not require an additional key material. Here, a procedure of deriving the TEK and AVP is as follows.

Meanwhile, a KSP is a pair of $\{KS_1, KS_2\}$, wherein the $KS_1$ and $KS_2$ are randomly generated by an RI. When the total number of TEKs which can be generated by a KSP is "n," the AVP may be calculated in two manners as below:

1. When the user is allowed to generate n number of TEKs:
AVP=KSP=$\{KS_1, KS_2\}$ 2. When the user is allowed to generate m number of TEKs (wherein m<n):

a) A hash function is applied to the $KS_1$ n iterations, as described above, and a sequence of hash values $\{S_i\}$ is stored.
$S_1$=hash $(KS_1)$, $S_2$=hash $(S_1)$, . . . $S_{n-1}$=hash $(S_{n-2})$, $S_n$=hash $(S_{n-1})$ The hash sequence as described above is called a forward hash sequence.

b) A hash function is applied to the $KS_2$ n iterations, as described above, and a sequence of hash values $\{M_i\}$ is stored, beginning at the last hash value.
$M_1$=hash $(M_2)$, $M_2$=hash $(M_3)$, . . . $M_{n-1}$=hash $(M_n)$, $M_n$=hash $(KS_2)$ That is, $M_1$ represents an $n^{th}$ hash value of the $KS_2$, and $M_2$ represents an $(n-1)^{th}$ hash value of the $KS_2$. Such a hash sequence is called a backward hash sequence.

c) AVP=$\{S_i, M_j\}$

Here, "i" represents the index (i.e. sequence number) of the first TEK which is usable by the user among a sequence of n TEKs, and "j" represents the index (i.e. sequence number) of the last TEK which is usable by the user among a sequence of n TEKs.

The description below is provided on the scenario where key materials are mapped. Meanwhile, when key materials are mapped, an SEK may be mapped to "a single SAVP=KSP" (i.e. KSP LT=SEK LT: n TEKs are derived from a KSP), or may be mapped to a plurality of SAVPs ($SAVP_1$=$KSP_1$, $SAVP_2$=$KSP_2$, . . . ). Also, a PEK may be mapped to a single PAVP derived from a related SAVP, or may be mapped to a plurality of PAVPs derived from one or more related SAVPs, respectively.

Also, a BSM may generate n TEKs from forward and/or backward hash sequences, as below.

$$TEK_i = S_i \text{ XOR } M_j$$

Here, the XOR represents a bit-wise exclusive OR operation.

In a terminal, m TEKs in $\{S_i, M_j\}$ are calculated as follows. That is, m number of $S_{i+x}$ values are calculated with respect to all x in an interval of [1,m], and m number of $M_{j-x}$ values are calculated with respect to all x in the interval of [1,m]. Finally, "$TEK_x = S_x \text{ XOR } M_x$" is calculated with respect to all x in an interval of [i,i+m].

Generally, in order to satisfy the demands for various security protocols, different types of hash functions may be used for TEK derivation, or a hash function may be truncated and output.

Figure 3:
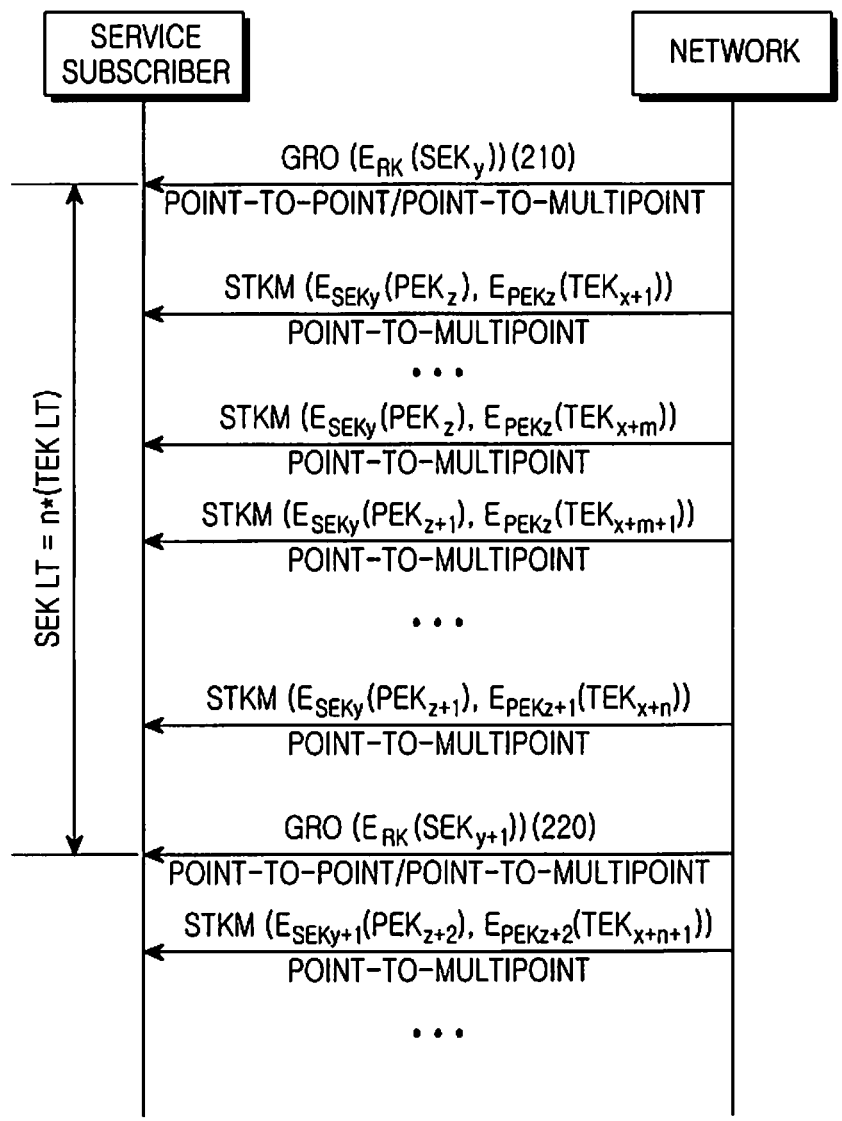
FIG. 3 is a flow diagram illustrating a procedure for providing SEK/TEK to a general service subscriber.
Figure 4:
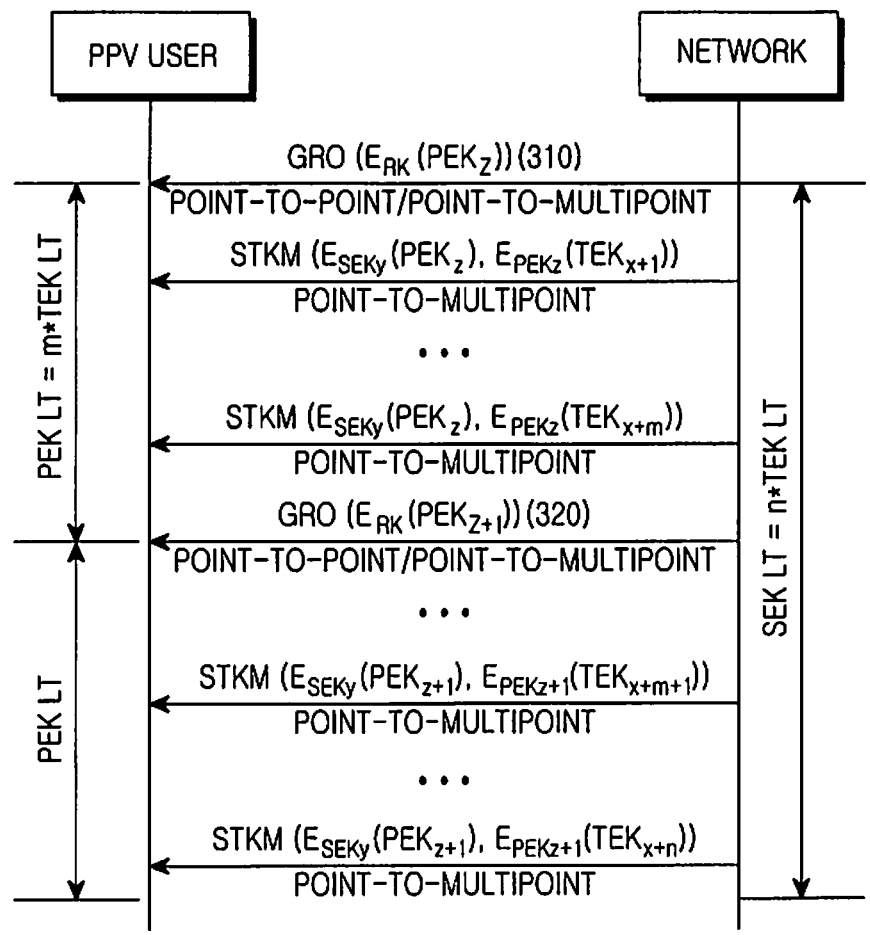
FIG. 4 is a flow diagram illustrating a procedure for providing SEK/TEK to a general PPV user.
Figure 6:
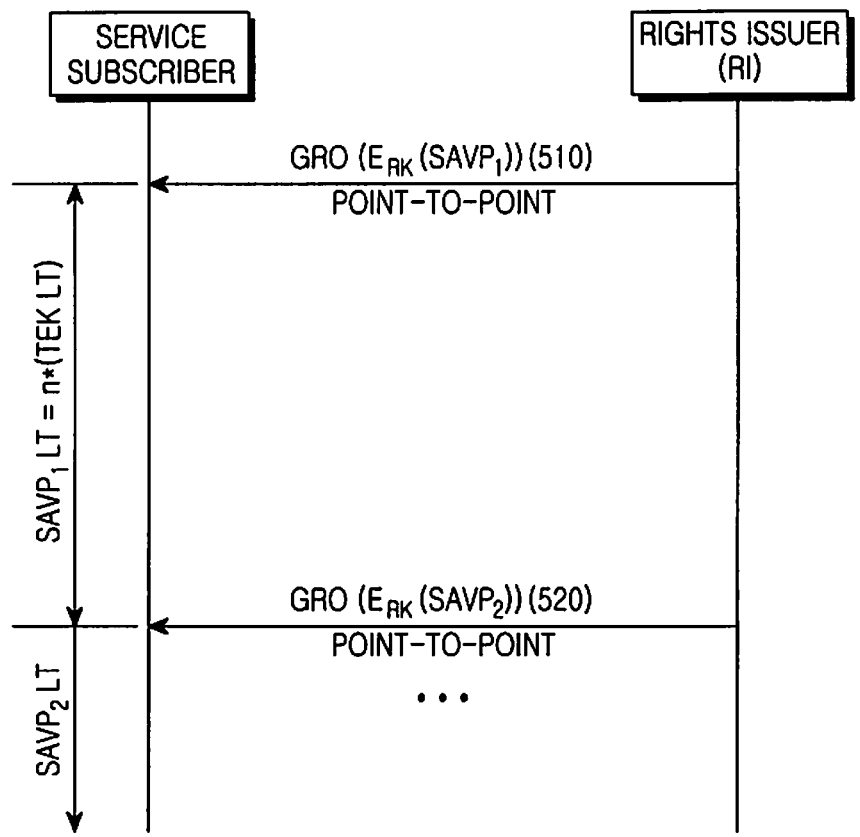
FIG. 6 is a flow diagram illustrating a procedure for providing an AVP to a service subscriber according to an embodiment of the present invention.
Figure 7:
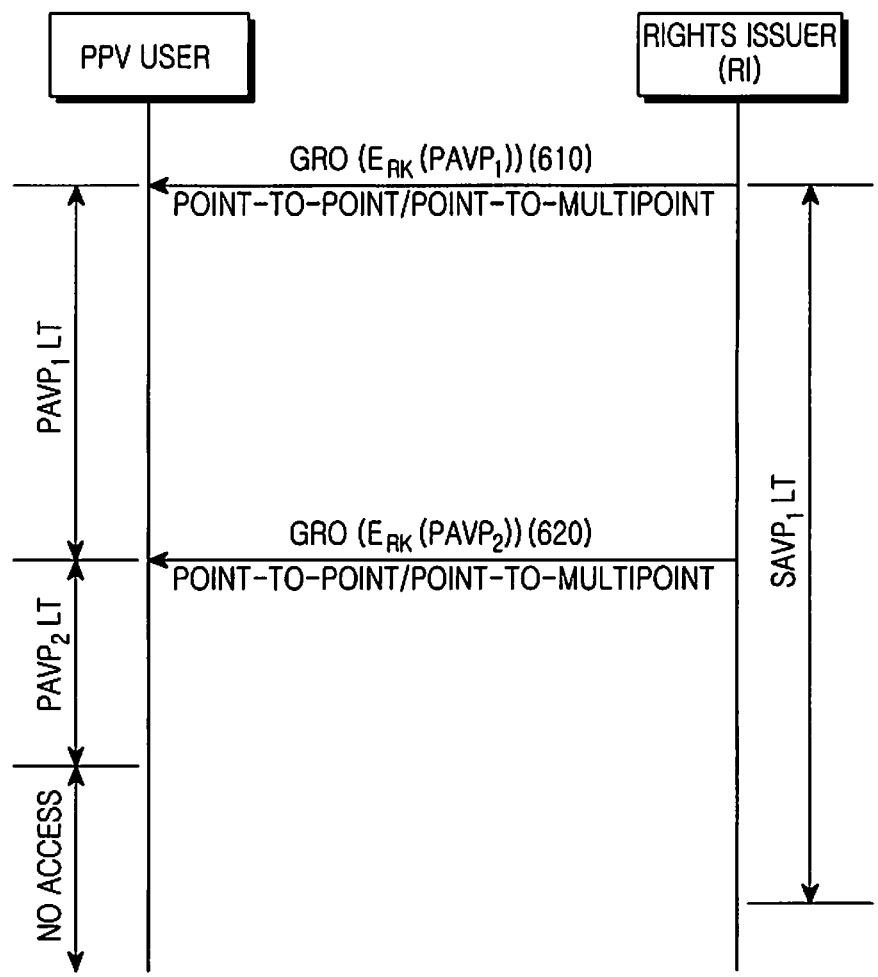
FIG. 7 is a flow diagram illustrating a procedure for providing an AVP to a PPV user according to an embodiment of the present invention.

FIGS. 6 and 7 are diagrams showing an example of key distribution according to an embodiment of the present invention. Conditions in FIGS. 6 and 7 are the same as those in FIGS. 3 and 4.

FIG. 6 is a diagram illustrating an SAVP provision flow in a subscription-based access condition according to an embodiment of the present invention.

In a subscription-based access condition according to an embodiment of the present invention, the lifetime of an SAVP is calculated to be n times that of a TEK. That is, n number of TEKs can be generated from an SAVP. When service provision starts, an RI generates and transmits a new $SAVP_1$ to a service subscriber through a GRO message in step 510. The $SAVP_1$ is encrypted by an $ERK_1$, which is shared only between the user and the RI. Also, before the $SAVP_1$ has expired, the RI newly generates and transmits an $SAVP_2$ to the service subscriber through a GRO message in step 520. The $SAVP_2$ also is encrypted by an $ERK_1$, which is shared only between the user and the RI.

FIG. 7 is a diagram illustrating a PAVP provision flow in a PPV-based access condition according to an embodiment of the present invention.

In a PPV-based access condition according to an embodiment of the present invention, the lifetime (PAVP LT) of a PAVP is calculated to be m times that of a TEK, wherein $m \leq n$. Although FIG. 7 shows an example where two PAVPs ($PAVP_1$, $PAVP_2$) are derived from an $SAVP_1$, there may be three or more PAVPs derived from the $SAVP_1$. The user has to issue a separate purchase request for every PAVP.

When the user performs a first purchase before starting an access to content, an RI transmits a $PAVP_1$ to the user through a GRO message in step 610. Also, before the $PAVP_1$ has expired, the user issues a second purchase request. When the purchase has been successfully completed, the RI transmits a $PAVP_2$ to the user through a GRO message in step 620. When the user does not issue a further purchase request before the $PAVP_2$ has expired, the RI does not transmit any PAVP, so that the user cannot access content any more.

In the following description, a key identification method according to an embodiment of the present invention will be described.

Table 1 below shows a mapping relation between key identifiers according to an embodiment of the present invention and key identifiers of a DRM profile.

TABLE 1

| DRM Profile | | Key Mapping according to embodiment of the present invention | |
|---|---|---|---|
| Key | Identification means | Key | Identification Means |
| None | | KSP | CID_extension (32 bits) This is a random value for identifying service/program key materials. |
| SEK | service_CID_extension (32 bits) This is a random value for identifying a service key material. | SAVP | CID_extension + TEK $ID_{LOW}$ + TEK $ID_{HIGH}$ Here, TEK $ID_{LOW}$ represents the sequence number of first TEK to be derived from SAVP, and TEK $ID_{HIGH}$ represents the sequence number of last TEK to be derived from PAVP. |
| PEK | program_CID_extension (32 bits) This is a random value for identifying a program key material. | PAVP | CID_extension + TEK $ID_{LOW}$ + TEK $ID_{HIGH}$ Here, TEK $ID_{LOW}$ represents the sequence number of first TEK to be derived from PAVP, and TEK $ID_{HIGH}$ represents the sequence number of last TEK to be derived from PAVP. |
| TEK for IPsec | SPI (32 bits) | TEK for IPsec | SPI (32 bits) = SAID (16 bits) □ TEK ID (16 bits) Here, SAID is random value, and TEK ID represents the sequence number of TEK. |
| TEK for SRTP | MKI (8*master_key_index_length bit) This is a master key index (MKI) which is the same as that defined in SRTP, and master_key_index_length represents length of MKI. | TEK for SRTP | MKI = TEK ID (>=2 bytes) (for SRTP) |
| TEK for ISMACryp | key_indicator (8*key_indicator_length bit) This is identifier of TEK, which is the same as that defined in ISMACryp, and key_indicator_length represents length of key indicator. | TEK for ISMACryp | key_indicator = TEK ID (>=2 bytes) |
| TEK for DCF | key_identifier (8*key_identifier_length bit) This is identifier of TEK, which is the same as that defined in DCF, and key_identifier_length represents length of key indicator. | TEK for DCF | key_indicator = TEK ID (>=2 bytes) |

The following description will be given on a GRO format according to an embodiment of the present invention. First, according to embodiments of the present invention, two formats may be applied for the GRO format.

One applicable format is an OMA DRM 2.0 Rights Object (RO) format. In the DRM 2.0, an RO can be included in a Protected Rights Object of a GRO message, which is transmitted from an RI to a terminal, and then the RO can be transmitted. The Protected Rights Object includes a Rights Object Payload. Therefore, an RO including new materials and attributes according to the present invention is inserted into a Rights Object Payload, and is then transmitted to a terminal through a GRO message. Here, the newly defined materials and attributes may be expressed in an XML format before they are inserted into the Rights Object Payload.

The other applicable format is a Broadcast Rights Object (BCRO) format. This is a format used when a GRO message is transmitted through a broadcast channel. The Broadcast Rights Object (BCRO) includes an "OMADRMAsset( )" object, which contains a service encryption/authentication key or program encryption/authentication key. This object is simply replaced by a TEX management extension proposed in the present invention, as shown in Table 2 below. AVP and "Master Salt" values can be encrypted in the same rule as that defined for service encryption/authentication key and program encryption/authentication key.

According to an embodiment of the present invention, configuration elements (i.e. materials) for TEKs are transmitted through a GRO message, so that the existing short-term key STKMs delivering TEKs are not required any more, except for STKM management data. Meanwhile, a GRO message includes access criteria and other attributes linked to encrypted content in connection with STKM management data. In other words, according to an embodiment of the present invention, an SEK and a PEK are replaced by an SAVP and a PAVP, respectively, the permission and attributes thereof are also replaced in the form of rights object (RO) having the format of a newly defined traffic encryption key management extension, and then a TEK is transmitted.

Table 2 below shows a traffic encryption key management extension of a Generalized Rights Object (GRO) according to an embodiment of the present invention.

TABLE 2

| SYNTAX | LENGTH (unit: bit) |
| --- | --- |
| protocol_version | 4 |
| CID_extension | 32 |
| number_of_traffic_keys | 16 |
| encrypted_access_value_length | 8 |
| encrypted_first_acccess_value | 8*encrypted_access_value_length |
| encrypted_second_access_value | 8*encrypted_access_value_length |
| number_of_tek_descriptors | 16 |
| tek_descriptor_loop( ) | |
|    traffic_protection_protocol | 3 |
|    traffic_authentication_flag | 1 |
|    if (traffic_protection_protocol == TKM_ALGO_IPSEC) | |
|       security_parameter_index | 16 |
|       number_of_traffic_keys | 16 |
|    if (traffic_protection_protocol == TKM_ALGO_SRTP) | |
|       master_key_index_length | 8 |
|       master_key_index | 8*master_key_index_length ($\geq 16$) |
|       number_of_traffic_keys | 16 |
|       master_salt_flag | 1 |
|       if (master_salt_flag == TKM_FLAG_TRUE) | |
|          master_salt_seed_low | 112 |
|          master_salt_seed_high | 112 |
|    if (traffic_protection_protocol == TKM_ALGO_ISMACRYP) | |
|       key_indicator_length | 8 |
|       key_indicator | 8*key_identifier_length ($\geq 16$) |
|       number_of_traffic_keys | 16 |
|    if (traffic_protection_protocol == TKM_ALGO_DCF) | |
|       key_identifier_length | 8 |
|       key_identifier_ | 8*key_identifier_length ($\geq 16$) |
|       number_of_traffic_keys | 16 |

TABLE 2-continued

| SYNTAX | LENGTH (unit: bit) |
| --- | --- |
|       protection_after_reception | 2 |
|       reserved_for_future_use | 1 |
|       access_criteria_flag | 1 |
|       program_flag | 1 |
|       reserved_for_future_use | 4 |
|       traffic_key_lifetime | 4 |
|    if (access_criteria_flag == TKM_FLAG_TRUE) | |
|       reserved_for_future_use | 8 |
|       number_of_access_criteria_descriptors | 8 |
|       access_criteria_descriptor_loop( ) | |
|          access_criteria_descriptor( ) | |
|    if (program_flag == TKM_FLAG_TRUE) | |
|       program_selectors_and_flags | |
|       reserved_for_future_use | 7 |
|       permissions_flag | 1 |
|       if (permissions_flag == TKM_FLAG_TRUE) | |
|          permissions_category | 8 |

Referring to Table 2, fields described below are fields which are inherited from an existing STKM and defined. The protocol_version field indicates a protocol version. The protection_after_reception field indicates whether or not traffic must be encrypted and stored after the traffic is received. The access_criteria_flag field indicates whether or not access criteria can be used for a given traffic encryption key. The traffic_protection_protocol field, a traffic protection protocol is specified. The traffic_authentication_flag field indicates, for example, whether or not traffic authentication is required for IP security protocol (IPsec).

The master_key_index_length field specifies the length of a master key index (MKI) in a secure real-time transport protocol (SRTP). The master_salt_flag field indicates whether or not a master salt is present. The key_indicator_length field specifies the length of a key indicator in an ISMACryp.

The key_identifier_length field specifies the length of a key indicator in a DCF. The traffic_key_lifetime field specifies the lifetime of a single traffic encryption key.

The number_of_access_criteria_descriptors field specifies the number of access criteria descriptors. The program_flag field indicates whether or not program permissions are present.

The access_criteria_descriptor( ) field specifies access criteria. The permissions_flag field specifies program permission. The permissions_category field specifies a program permission category. The reserved_for_future_use field is specified on all occasions.

In contrast, the following fields are fields newly introduced for supporting the traffic encryption key management method according to the present invention. The CID_extension field is the extension of the service_CID and the program_CID, which are content identifiers defined in a DRM profile, and allows to identify a service access value pair/a program access value pair for one service/program, together with TEK $ID_{LOW}$ and TEK $ID_{HIGH}$. The CID_extension is substituted for the service_CID_extension and program_CID_extension, which are currently used in a DRM profile of an OMA BCAST.

The number_of_traffic_keys field indicates the number of TEKs derived from a given AVP.

The encrypted_access_value_length field indicates the length of AVPs.

The encrypted_first_access_value field encrypts a first material of AVP($S_i$). Here, the materials of the AVP may be encrypted in the same manner as that defined for key encryption in a DRM profile.

The encrypted_second_access_value field encrypts a second material of AVP($M_j$).

The number_of_tek_descriptors field indicates the number of TEK descriptors in management data. Here, a management extension includes at least one TEK descriptor. Also, available TEK descriptors may thoroughly describe permissions and attributes linked to content, and a given AVP. That is, it may be given to all TEKs.

The security_parameter_index field is inherited from an STKM and is modified. The security_parameter_index provides a link to a first IPsec ESP header, which is related to content protected by a first TEK derived from an AVP.

The number_of_traffic_key field indicates a range of TEKs in which the current tek_descriptor is available, and begins at a TEK-ID-part value in an IPsec, an SRTP, a security_parameter_index of an ISMACryp or DCF, a master_key_index, a key_indicator, or a key_identifier.

The master_key_index field is inherited from an STKM and is modified. The master_key_index provides a link to an SRTP header, which is related to content protected by a first TEK derived from an AVP.

The master_salt_seed_low field is a first random value of a second AVP used to derive the required number of salt values (wherein, at least one salt value can be set for every traffic encryption key). A terminal performs the same procedure as that defined to derive salt values when generating a TEK. Also, the terminal may truncate the derived values to 112 bits.

The master_salt_seed_high field is a second random value of a KSP used to derive salt values.

The key_indicator field is inherited from an STKM and is modified. The key_indicator provides a link to a first TEK used to decrypt AUs.

The key_identifier field is inherited from an STKM and is modified. The key_identifier provides a link to a first TEK which is used to decrypt DCF-encrypted files.

Figure 8:
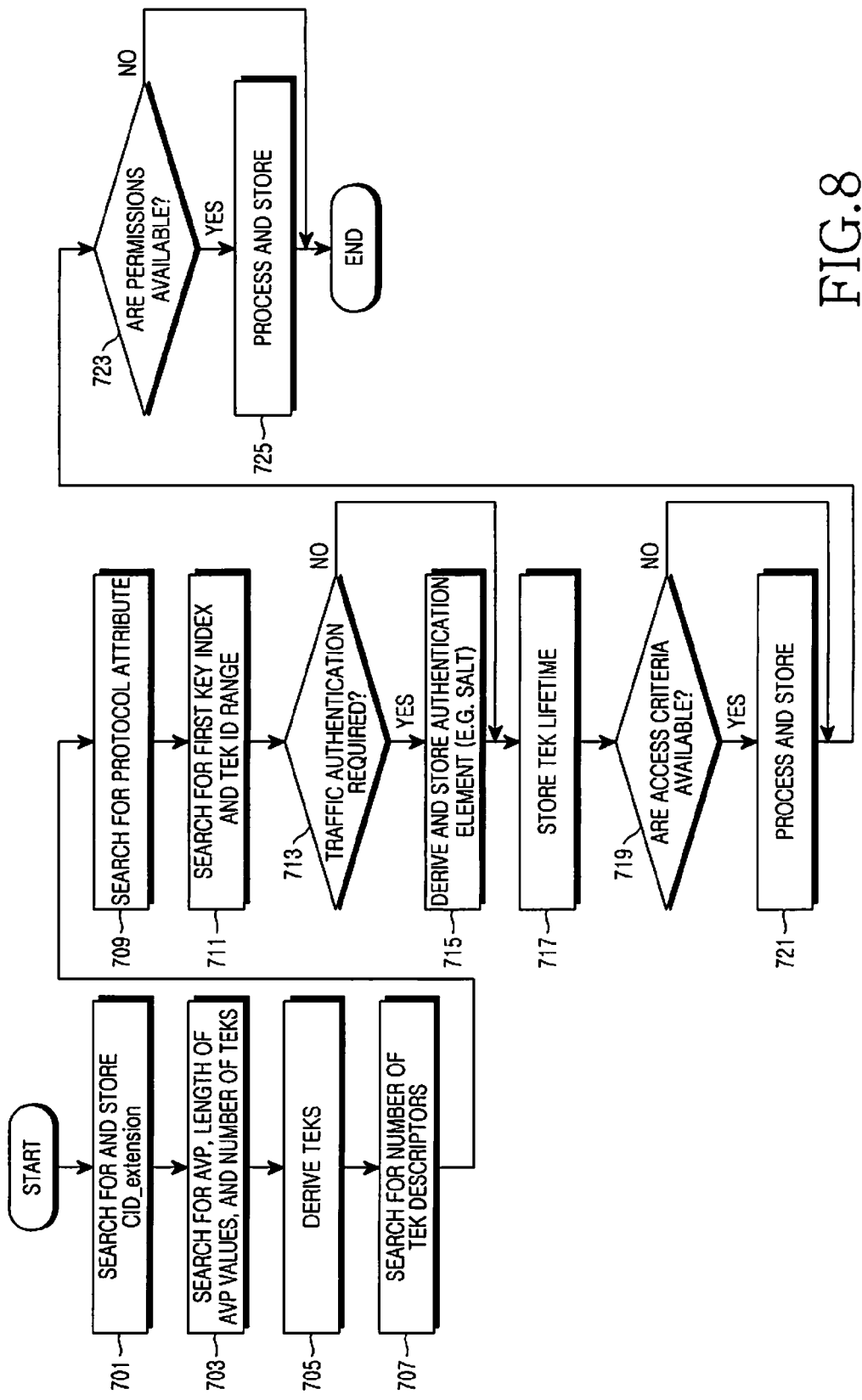
FIG. 8 is a flowchart illustrating a procedure of processing a generalized rights object message in a terminal according to an embodiment of the present invention.

FIG. 8 is a flowchart illustrating a procedure of processing a TEK management extension in a terminal according to an embodiment of the present invention.

Referring to FIG. 8, a terminal receives a GRO message, and searches for and stores a CID_extension in step 701. In step 703, the terminal derives an AVP, and checks the length (e.g. an available lifetime of the AVP) of the given AVP, and the number of TEKs which can be derived from the AVP.

In step 703, the terminal may search for an encrypted_first_access_value, an encrypted_second_access_value, the number_of_traffic_keys, and encrypted_access_value_length, in the GRO message. Then, the terminal calculates a set of TEKs based on the searched values in step 705.

In step 707, the terminal checks the number of TEK descriptors. This can be achieved through the number_of_tek_descriptors. The TEK descriptors include description about the given AVP, and contain descriptions about attributes and permissions linked to content. In step 709, the terminal searches for protocol attributes. For example, the terminal checks the protocol_version, and checks the traffic_protection_protocol and the traffic_authentication_flag. In step 711, based on the selected traffic protection protocol, that is, through the use of the number_of_traffic_keys and protocol-specific indexing, a range of a TEK ID, to which the current TEK descriptor is applied, is searched for and a link related to content is stored. When it is determined that authentication of the traffic is required in step 713, the procedure proceeds to step 715, where a traffic authentication material (e.g. salts) is derived. In step 717, a TEK lifetime is stored every current range of TEKs from the traffic_key_lifetime.

When it is determined that access criteria are available in step 719, the procedure proceeds to step 721, where access criteria every current range of TEKs are processed and stored for the current order and the next order. When it is determined that program permissions are available in step 723, the procedure proceeds to step 725, where the program permissions (i.e. permissions_category) are processed and stored.

Although several embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. An encryption key distribution method for protecting a broadcast service provided to a terminal in a mobile broadcasting system, the method comprising the steps of:
   generating, by a network, a first encryption key when the broadcast service is first provided to the terminal;
   transmitting a first generalized rights object message to the terminal, wherein the first generalized rights object message comprises values for identifying a first access value pair for the first encryption key;
   generating, by the network, a second encryption key before a lifetime of the first encryption key expires; and
   transmitting a second generalized rights object message to the terminal, wherein the second generalized rights object message comprises values for identifying a second access value pair for the second encryption key;
   wherein the first access value pair and the second access value pair each derive a set of traffic encryption keys.

2. The method as claimed in claim 1, wherein the first access value pair and the second access value pair include a service access value pair and a program access value pair, respectively, the program access value pair being derived from the service access value pair.

3. The method as claimed in claim 1, wherein the lifetime of the first encryption key and a lifetime of the second encryption key of the first access value pair and the second access value pair are an integer multiple of a lifetime of a traffic encryption key derived from the first encryption key and second encryption key, respectively.

4. The method as claimed in claim 1, wherein the first access value pair and the second access value pair each include a first index and a last index of a respective set of traffic encryption keys, and
   the network transmits the generalized rights object message to the terminal in response to the terminal purchase request for the first encryption key and the second encryption key, the generalized rights object message including a rights object which contains the first access value pair and the second access value pair.

5. The method as claimed in claim 4, wherein the network transmits the first and second generalized rights object messages for broadcasting to the terminal in response to the terminal purchase request for the first encryption key and the second encryption key, and
   wherein the first and second generalized rights object messages for broadcasting includes a broadcasting rights object including the first access value pair and the second access value pair.

6. The method as claimed in claim 1, wherein the first encryption key and the second encryption key are keys encrypted with a subscriber management key which is shared between the terminal and the network.

7. A method for receiving, by a terminal, an encryption key distributed for protection of a broadcast service in a mobile broadcasting system, the method comprising the steps of:
- receiving a generalized rights object message from a network;
- verifying the generalized rights object message using a subscriber management key;
- checking identification information for identifying an encryption key included in the generalized rights object message, using a security function;
- identifying an access value pair for the encryption key through the identification information;
- storing the access value pair; and
- deriving a set of traffic encryption keys from the access value pair.

8. The method as claimed in claim 7, wherein checking the identification information, by the terminal, comprises:
- checking a service access value pair from the access value pair; and
- checking at least one program access value pair derived from the service access value pair.

9. The method as claimed in claim 7, wherein checking the identification information, by the terminal, comprises:
- checking the access value pair identified through the identification information, a lifetime of the access value pair, and a number of traffic encryption keys in the set of traffic encryption keys derived from the access value pair.

10. The method as claimed in claim 9, wherein checking the identification information, by the terminal, comprises:
- checking a number of descriptors containing description on the access value pair; and
- checking the checked number of descriptors.

11. The method as claimed in claim 10, further comprising searching, by the terminal, for a range of the traffic encryption keys to which the checked number of descriptors are applied.

12. An encryption key distribution system for protecting a broadcast service provided to a terminal in a mobile broadcasting system, the encryption key distribution system comprising:
- a network for generating a first encryption key when the broadcast service is first provided to the terminal, transmitting a first generalized rights object message to the terminal, wherein the first generalized rights object message comprises values for identifying a first access value pair for the first encryption key, generating a second encryption key before a lifetime of the first encryption key expires, and transmitting a second generalized rights object message to the terminal, wherein the second generalized rights object message comprises values for identifying a second access value pair for the second encryption key; and
- the terminal for receiving the first and second generalized rights object messages from the network, checking identification information for identifying the first and second encryption keys included in the first and second generalized rights object messages, and identifying and storing the first and second access value pairs for the first and second encryption keys through the checked identification information;
- wherein the first access value pair and the second access value pair each derive a set of traffic encryption keys.

13. The encryption key distribution system as claimed in claim 12, wherein the first access value pair and the second access value pair comprise a service access value pair and a program access value pair, respectively, the program access value pair being derived from the service access value pair.

14. The encryption key distribution system as claimed in claim 13, wherein the lifetime of the first encryption key and a lifetime of the second encryption key of the first access value pair and the second access value pair are an integer multiple of a lifetime of a traffic encryption key derived from the first encryption key and second encryption key, respectively.

15. The encryption key distribution system as claimed in claim 14, wherein the first access value pair and second access value pair comprise a first index and a last index of a respective set of traffic encryption keys, and
- the network transmits the generalized rights object message to the terminal in response to the terminal purchase request for the first encryption key and the second encryption key, the generalized rights object message including a rights object which contains the first access value pair and the second access value pair.

16. The encryption key distribution system as claimed in claim 15, wherein the network transmits the first and second generalized rights object messages for broadcasting to the terminal in response to the terminal purchase request for the first encryption key and the second encryption key, and
- wherein the first and second generalized rights object messages for broadcasting comprises a broadcasting rights object which includes the first access value pair and the second access value pair.

17. The encryption key distribution system as claimed in claim 12, wherein the terminal checks a service access value pair from the access value pair, and checks at least one program access value pair derived from the service access value pair.

18. The encryption key distribution system as claimed in claim 12, wherein the terminal checks the first and second access value pairs identified through the identification information for identifying the first and second encryption keys, a lifetime of the first and second access value pairs, and a number of traffic encryption keys in the sets of traffic encryption keys which can be derived from the first and second access value pairs.

19. The encryption key distribution system as claimed in claim 18, wherein the terminal checks a number of descriptors containing description on the first and second access value pairs, and checks the descriptors.

20. The encryption key distribution system as claimed in claim 19, wherein the terminal searches for a range of the traffic encryption keys to which the checked descriptors are applied.

* * * * *